Dec. 8, 1964     S. J. MARENTETTE     3,160,388
SHUTOFF COCK
Filed May 24, 1962
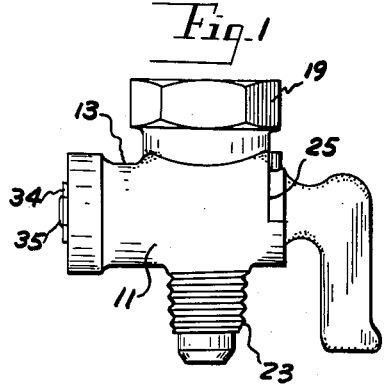
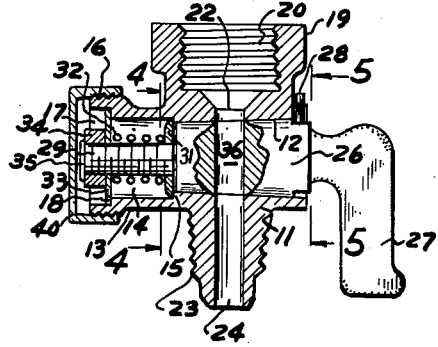
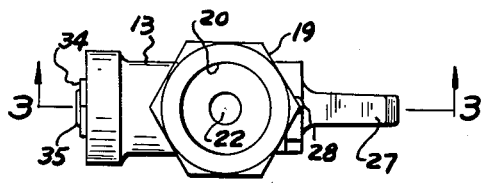
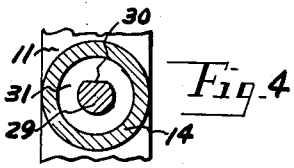
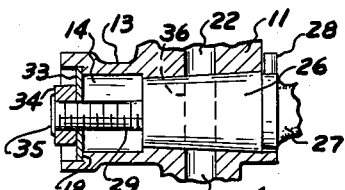
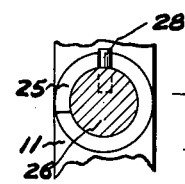
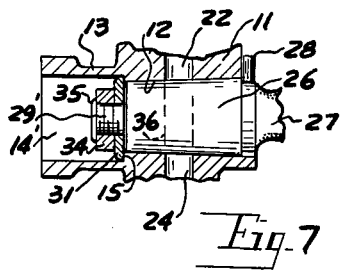
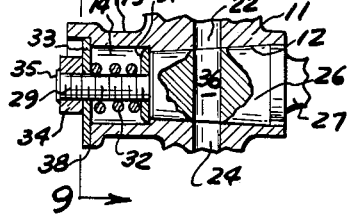
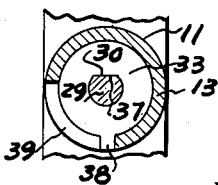
INVENTOR.
SYLVAIN J. MARENTETTE
BY
*Robert A. Sloman*
ATTORNEY

United States Patent Office 3,160,388
Patented Dec. 8, 1964

3,160,388
SHUTOFF COCK
Sylvain J. Marentette, Detroit, Mich., assignor to Brass Products Company, Detroit, Mich., a corporation of Michigan
Filed May 24, 1962, Ser. No. 197,465
2 Claims. (Cl. 251—183)

The present invention relates to a shutoff cock for controlling the flow of fluids, and more particularly to a shutoff cock for regulating the flow of natural gas for use in conjunction with any burning apparatus, such as a heater, a furnace or a stove, but not limited thereto, it being contemplated that said shutoff cock may also be employed for controlling the flow of other gases such as propane or butane, or liquids, paint thinner, or solvents, or the like.

Heretofore in shutoff cock constructions, there is normally employed a tapered rotor which rotates within a tapered bore of the body of the shutoff cock, but which in assembled relation may be removed or axially withdrawn from its normal use position facilitating tampering damage which could be eliminated if the rotor is so constructed and arranged within the shutoff cock body as to be longitudinally non-displaceable.

It is therefore the primary object of the present invention to provide a new form of shutoff cock wherein the manually operative rotor thereof is longitudinally non-displaceable within and with respect to the bore of the shutoff cock.

It is another object of the present invention to provide a novel mounting assembly for the manually operable motor of a shutoff cock and wherein positive means are employed for retaining the rotor against longitudinal movement relative to the bore within which it is mounted.

It is another object of the present invention to provide a non-displaceable rotor, which though being spring-biased in assembled relationship, is nevertheless positively retained against axial displacement within and relative to the bore of the body of the shutoff cock.

It is another object of the present invention to provide a novel spring retainer within the shutoff cock assembly whereby the said retainer and compression spring in engagement therewith is adapted for rotation with the rotor, and thus precludes the possibility of relative rotation tending to loosen the securing nut.

It is another object of the present invention to provide a counterbore with respect to the bore of the shank of the shutoff cock body within which is positioned a retainer washer fixedly secured to a shank extension of the rotor and in such fashion as to retain the said rotor against axial displacement.

It is another object of the present invention to provide a retainer stop, as above referred to, which is keyed or otherwise secured to the shank extension of the said rotor and which is adapted for rotation therewith, and with respect to a seat defined by the counterbore relative to the main bore of the shank of the shutoff cock body.

It is another object of the present invention to provide in conjunction with the retainer washer which is rotatively connected with the rotor extension so as to not only retain the said rotor against longitudinal displacement, with respect to the body of the shutoff cock, but also to limit rotary movements of the said rotor.

These and other objects will be seen from the following specification and claims in conjunction with the appended drawing, in which:

FIG. 1 is a front elevational view of the present shutoff cock.

FIG. 2 is a plan view thereof.

FIG. 3 is a section taken on line 3—3 of FIG. 2.

FIG. 4 is a fragmentary section taken on line 4—4 of FIG. 3.

FIG. 5 is a fragmentary section taken on line 5—5 of FIG. 3.

FIG. 6 is a fragmentary section-similar to the shutoff cock assembly of FIG. 3, but showing the variation in the construction which omits the rotor biasing spring.

FIG. 7 is a fragmentary section similar to FIG. 3, as well as FIG. 6, showing another means by which the rotor is retained against longitudinal displacement.

FIG. 8 is a fragmentary section similar to FIG. 3 showing a slight variation in the construction of the retainer washer to serve the additional function of limiting rotary movements of the rotor.

FIG. 9 is a fragmentary section taken on line 9—9 of FIG. 8.

It will be understood that the above drawing illustrates merely a preferred embodiment of the invention and that other embodiments are contemplated within the scope of the claims hereinafter set forth.

Referring to the drawing, FIGS. 1 through 5 show an illustrative embodiment of the present invention wherein the shutoff cock includes the body 11, preferably constructed of cast or forged brass, and which has extending thereinto from one side a tapered bore 12. The shank 13 projects from the opposite side of the body 11 as a part thereof, and includes the cylindrical bore 14, which communicates with the reduced end of tapered bore 12 and thus defines in the said body the shoulder stop 15.

The shank 13 has a radially enlarged end portion 16, FIG. 3, having an internal counterbore 17 which relative to the bore 14 defines in the said shank a second shoulder stop 18.

The body 11, upon its upper end, for illustration, includes the enlarged hex-shaped extension 19, which is internally threaded at 20 to permit coupling to a supply conduit or pipe of any nature adapted for delivering fluid, either liquid or gas into and through the said shutoff cock and controlled thereby.

The threaded portion 20 of fitting 19 at its lower end terminates in the inlet 22, which is in longitudinal registry with the outlet passage 24 formed within the nipple portion 23 on the diametrically opposing side portion of the body 11 to thus provide an attaching means for connecting the shutoff cock to an additional conduit for the further delivery of the fluids and the flow thereof under the control of the said shutoff cock.

The body 11, at the open end thereof, has formed therein an arcuate notch 25, whose opposite ends serve as stops for alternate cooperative retaining registry with the stop pin 28 which projects radially from one end of the tapered rotor 26, which is rotatively nested within the tapered bore 12, and upon the exterior of the said body includes the right angular handle 27.

The opposite end of rotor 26, at its reduced end terminates in the elongated threaded shank 29 which projects axially through the shank 13, centrally of the bores 14 and 17, said shank being flat along its top surface as at 30 to provide a securing key for the stop washer 31, which as shown in FIG. 4 is snugly projected over the shank 29 and bears against the shoulder stop 15, FIG. 3.

The washer 31 is of a shape corresponding to the cross sectional shape of the shank 29, as best shown in FIG. 4, whereby the said stop washer is keyed to the shank, and is adapted for rotation therewith.

In the assembly of the present shutoff cock, the coiled spring 32 is positioned around the shank 29 and is retained in compression between the stop washer 31 and the retainer washer 33. Said retainer washer is apertured to be positioned over the shank 29 within the counterbore 17, and bears against the second shoulder stop 18, and is retained against said shoulder by the nut 34. Nut 34 is threaded onto the shank 29 and is tightened sufficiently against the retainer washer so as to retain the rotor 26 against longitudinal displacement with respect to the body 11. At the same time the nut 34 is not so tight as to unduly or unnecessarily retain the said rotor against rotation within bore 12.

The degree of tightening of the nut 34 will determine the amount of pressure which is applied by retainer washer 33 to the stop shoulder 18, forming a part of the shank 13.

In the illustrative embodiment of the invention, the nut 34 is fixedly secured upon the shank 29, after being adjusted thereon in any suitable manner. For this purpose and as shown in FIG. 3, the end of the shank 29 is turned over or peened as at 35 so as to retainingly engage the said nut 34 against longitudinal displacement relative to the shank 29, outwardly thereof. Accordingly, this is one means which is provided for preventing loosening of the nut 34, which would facilitate a disassembly of the rotor 26, or its longitudinal displacement with respect to the body 11.

It is noted also that since the retainer washer 31 is keyed to shank 29, it will rotate therewith with the result that the coiled spring 32 will tend to rotate at the same time. Since the spring is thus rotatable with the shank 29 there is less tendency of the nut 34 to be loosened by relative rotation of the shank with respect to the spring which, due to its compression, might otherwise be retained against rotation between the two washers 31 and 33.

As shown in FIG. 3, the closure cap 40 may be provided, which is threaded over the outer enlarged end portion 16 of the shank 13. This has the advantage of excluding dirt and moisture from the interior of the shutoff cock, also to prevent tampering therewith. The cap 40 may be omitted, if desired.

It is contemplated also as a part of the present invention that the retainer washer 33 may be keyed, if desired, upon the shank 29 for rotation therewith, such as by providing the flat portion 37 in the aperture of the washer 33, such as shown in FIG. 9.

A slight variation of the invention is shown in FIG. 6, and wherein like parts are similarly identified corresponding to FIG. 3 and the description is not repeated. The primary difference, however, in the illustration in FIG. 6 is that a stop washer 31 has been omitted, and likewise the coiled spring 32. In this case, the rotor 26 is retained against axial displacement with respect to the body 11 by means merely of the retainer washer 33, which seats against the shoulder stop 18 and is retained thereon by the nut 34, the same as above described with respect to FIG. 3, said shank 29 at its end being turned over at 35 for fixedly securing the said nut against endwise loosening movement.

Another variation of the present invention is shown in FIG. 7 wherein the number of the parts corresponding to the parts shown in FIG. 3 and their description is omitted. The primary difference here is that shank 13 has mounted within its bore 14' the stop washer 31, which bears against the shoulder stop 15 and is directly secured with respect thereto by the nut 34 which is threaded on the short shank 29', which projects axially from rotor 26.

Here also the shank 29 is turned over as at 35. This structure also will retain the rotor 26 against longitudinal displacement.

Another variation of the invention is shown in FIGS. 8 and 9, which construction is very similar to what is shown in FIG. 3. The primary difference is that the pin 28 carried on the rotor 26, shown in FIG. 3, limiting rotary movements within the slot 25, has been omitted. In its place the retainer washer 33 is constructed providing a retaining key 38, which is movably positioned within an arcuate radial slot 39 formed in an outer portion of the shank 13, as best shown in FIG. 9.

In this case, it is necessary that the retainer washer 33 be keyed to the shank 29. Accordingly, as best shown in FIG. 9, the said washer 33 has in its central aperture a flat portion 37 which is in cooperative registry with the flat 30 on the said shank. Accordingly, it is seen that the retainer washer 30 performs an additional function of limiting rotary movements of the said rotor 26 within and with respect to the bore 12 of the body 11.

The present shutoff cock is primarily directed for the control of the flow of natural gas, for example, directed to a burning apparatus such as heater, a stove, or a furnace or a burner, but of course would include control of the flow of any other type of gas, such as propane, or butane, or for that matter may be employed for regulating and controlling the flow of liquids, including solvents, and related fluids.

While the removable cap 40 has been shown, FIG. 3, as positioned over the shank 13 for closing the open end thereof, it is contemplated that said removable cap could also be employed with the variations of the invention shown in FIGS. 6, 7 and 8. One advantage of the cap is that it keeps dirt and moisture from the interior of the body of the shutoff cock.

In the illustrations in the drawing, FIGS. 3, 6, 7 and 8, there is shown a transverse passage 36 which extends through the rotor 26 and depending upon the rotative position of said rotor is adapted to register in varying amounts with the passages 22 and 24 for thus controlling and regulating the flow of fluids, either gases or liquids, through the said shutoff cock.

Having described my invention, reference should now be had to the following claims.

I claim:

1. In a shutoff cock for controlling the flow of fluids, a body having a tapered bore, a shank on the body having an internal bore greater than and communicating with the reduced end of said tapered bore defining a shoulder stop, a tapered rotor nested in said tapered bore, and including a handle, a threaded shank of reduced diameter axially projecting from the rotor and into said shank bore, a stop washer mounter over said rotor shank bearing against said shoulder stop, said body shank terminating in a counterbore of increased diameter defining a second shoulder stop, a retainer washer within said counterbore mounted over and keyed to said rotor shank and bearing against said second shoulder stop, a coiled spring in said shank bore mounted over the rotor shank and interposed in compression between said washers, and a nut within the counterbore threaded on and secured to said rotor shank operatively engaging said retainer washer.

2. In the shutoff cock of claim 1, said retainer washer being keyed to said rotor shank for rotation therewith, there being an arcuate radial slot formed within the outer end of said body shank defining in said shank a pair of spaced stops, and a key radially projecting from said retainer washer movable within said radial slot and alternately engagable with said body stops limiting movements of said rotor.

References Cited by the Examiner

UNITED STATES PATENTS

| | | | |
|---|---|---|---|
| 782,366 | 2/05 | Stroud | 151—69 |
| 1,256,602 | 2/18 | Slaw | 137—625.47 XR |
| 1,398,329 | 11/21 | King | 251—287 XR |
| 1,788,750 | 1/31 | Snyder | 151—69 XR |
| 2,318,638 | 5/43 | Scott | 251—189 XR |
| 2,389,036 | 11/45 | Fennell | 251—183 XR |
| 3,038,695 | 6/62 | Wildern | 251—181 |

FOREIGN PATENTS

| | | |
|---|---|---|
| 1,174,552 | 12/58 | France. |
| 210,694 | 8/60 | Germany. |
| 378,652 | 8/32 | Great Britain. |
| 500,661 | 2/39 | Great Britain. |

LAVERNE D. GEIGER, *Primary Examiner.*